United States Patent

Hillman

[11] 3,892,501
[45] July 1, 1975

[54] WIND-DRIVEN MOTIVE APPARATUS

[76] Inventor: Edwin K. Hillman, 907 W. Desert Cove, Phoenix, Ariz. 85029

[22] Filed: Jan. 23, 1974

[21] Appl. No.: 435,876

[52] U.S. Cl. .................................. 416/65; 416/83
[51] Int. Cl.² .................................... F03D 3/02
[58] Field of Search ....... 416/65, 83, 110, 111, 119, 416/11, 10; 415/141

[56] References Cited
UNITED STATES PATENTS

| 148,927 | 3/1874 | Chapin | 416/83 |
|---|---|---|---|
| 930,956 | 8/1909 | Gracey | 416/101 |
| 1,321,415 | 11/1919 | Brown | 416/10 X |
| 1,339,131 | 5/1920 | Patrono | 416/111 |
| 1,451,298 | 4/1923 | Greth | 416/10 X |

FOREIGN PATENTS OR APPLICATIONS

| 182,700 | 7/1922 | United Kingdom | 416/11 |
|---|---|---|---|
| 462,724 | 4/1951 | Italy | 416/10 |

*Primary Examiner*—Everette A. Powell, Jr.

[57] ABSTRACT

Apparatus for translating the force of the wind into rotational movement of a power takeoff pulley is disclosed. A pair of slidable and pivotable vanes, interconnected by a loop of flexible material, such as rope, are alternately broadside or edgewise to the eye of the wind. When one vane is broadside to the wind, the wind will induce rotation thereof with commensurate movement of the rope producing edgewise rectilinear travel of the other vane into the eye of the wind. Further movement of the rope induced by the rotating vane will result in rotation of the other vane out of the eye of the wind, at which point the force of the wind will cause rotation thereof and rectilinear travel of the formerly rotating vane. A pair of pulleys, one of which may serve as the power takeoff pulley, engage the rope and rotate in response to the movement of the rope induced by the vanes.

10 Claims, 8 Drawing Figures

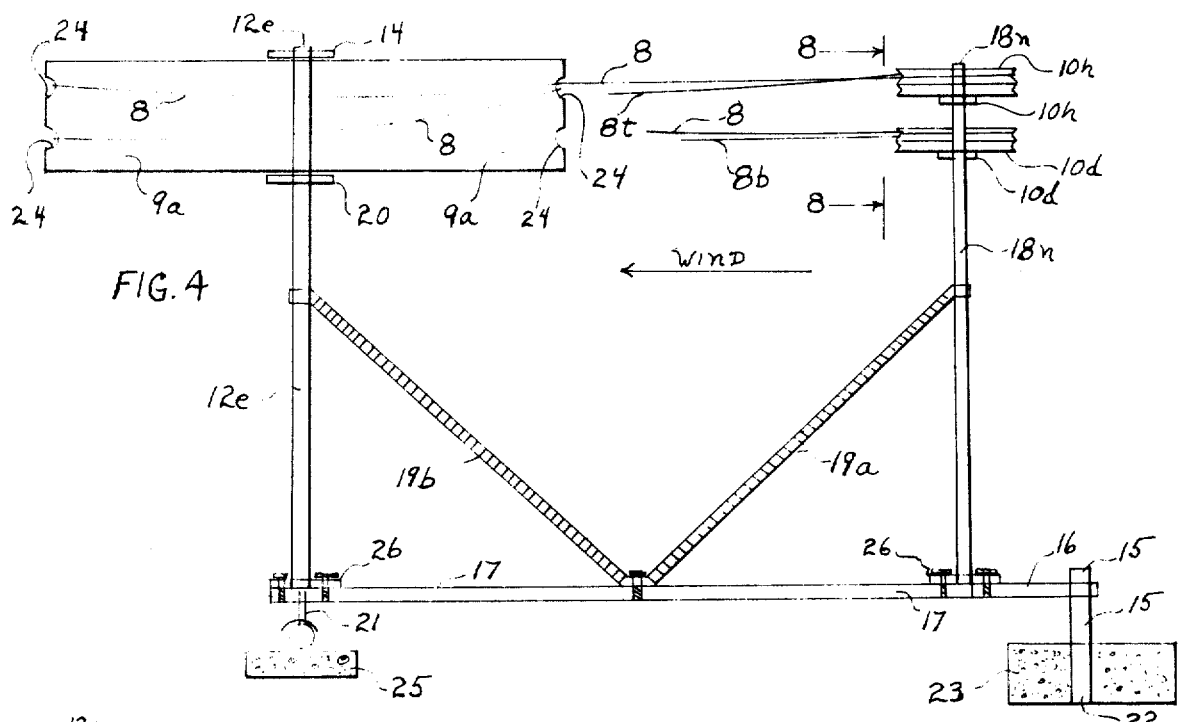
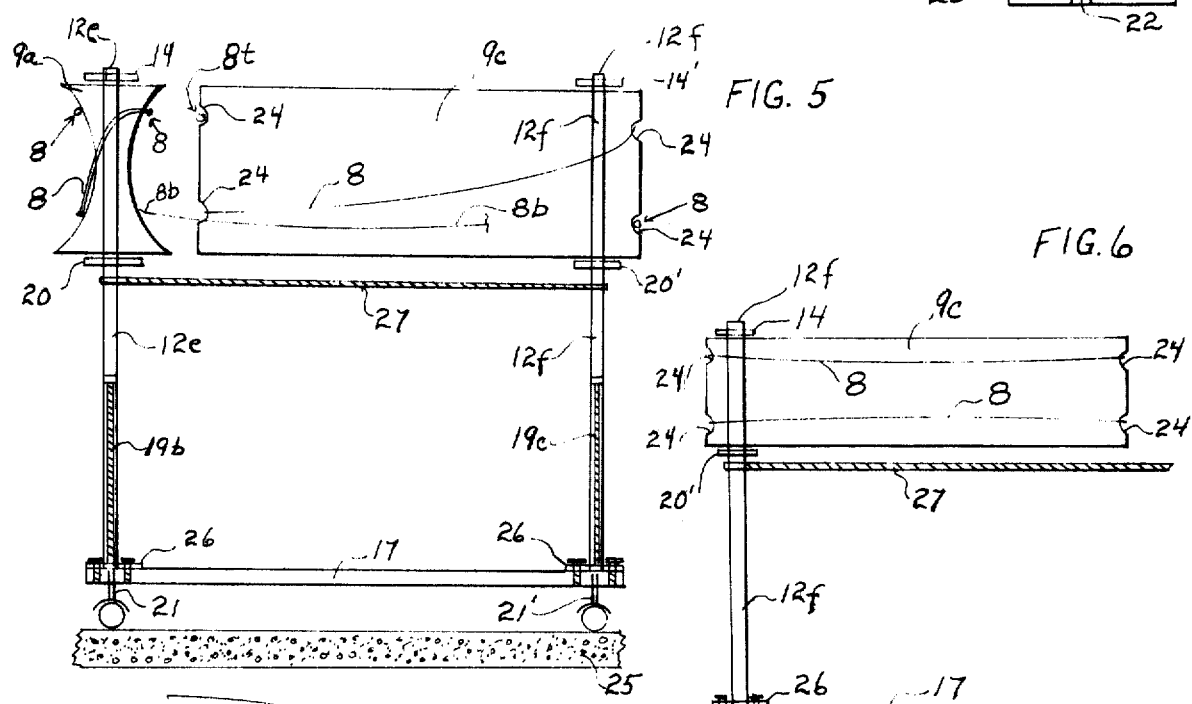
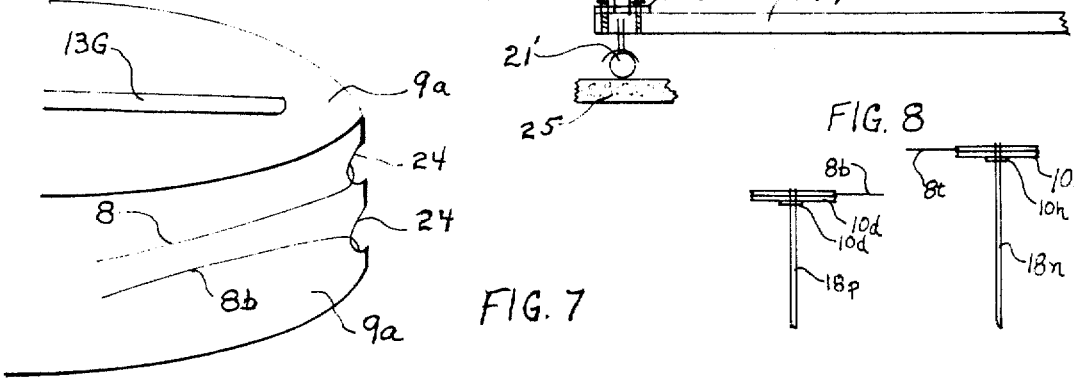
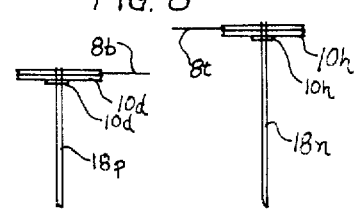

WIND-DRIVEN MOTIVE APPARATUS

The present invention relates to apparatus for harnessing the force of the wind, and more particularly, to apparatus presenting a constantly varying surface area for engaging the wind.

Various devices have been used for many years to harness the energy available from the wind. One of the most common of these devices is that of a fan-mounted upon a derrick, generally referred to as a windmill. Usually, the fan includes a rudder-like member for positioning the fan normal to the eye of the wind. The structure and configuration of the fan are such that it is primarily intended for low rotational speed operation. The low rotational speed and high torque output lends this type of apparatus to be particularly suitable for connection to a reciprocating water pump. When so used, it is usually located at remote water holes for supplying water to cattle or other livestock. One of the primary disadvantages of this type of apparatus is that severe damage may occur to the fan or the operating mechanism during high wind conditions. Because of this disadvantage, the rudder-like mechanism is usually manually pivotable so as to align the fan with the wind and thereby prevent the wind from causing the fan to rotate. To be effective the apparatus must, of course, be within easy access to the operator and such is not often the case at remote locations.

Another distinct type of wind-driven apparatus is that in which the operative element rotates on a vertical axis. Generally, this type of apparatus includes a plurality of arms extending in a horizontal plane. A cup shaped wind engaging device is secured to the extremity of each arm. The devices are similarly oriented at the extremities of the arms with the result being that of one-half of the apparatus presents a greater resistance to the wind than the other half. The disparate resistance to the wind causes the wind to react more strongly on one half of the apparatus than the other. The unequal reaction, in turn, causes the apparatus to rotate about its vertical axis. A typical example of this type of device is a wind speed measuring device known as an anemometer.

Variations on the above discussed types of wind-driven apparati have also been developed. One of the most notable developments is that of a device functioning similarly to an anemometer but having its arms either curved or dished whereby the wind coacts with one half of the apparatus with substantially greater force than the other half. However, each of these types of apparatus include non-varying surface area elements extending from a hub, whether that hub be in the vertical or horizontal axis.

It is therefore a primary object of the present invention to provide a variable surface wind responsive power generator.

Another object of my invention is to provide a means for varying the area of the surfaces subjected to the force of the wind as a function of the rotational position of the power generator.

A yet another object of the present invention is to provide a means for orienting the power generator with respect to the eye of the wind.

A still another object of the present invention is to provide means which control the biasing of rope means used to generate power.

A further object of the present invention is to provide vertical pivoting vanes for varying the surface area engaging the wind.

These and other objects of the invention will become more readily apparent to those skilled in the art as the description thereof proceeds.

The present invention may be described with more specificity and clarity with reference to the following drawings, in which:

FIG. 4 illustrates a side view of the present invention taken along lines 4—4, as shown in FIG. 1;

FIG. 5 illustrates a cross-sectional view of the present invention taken along lines 5—5, as shown in FIG. 1;

FIG. 6 illustrates a side view of the present invention taken along lines 6—6, as shown in FIG. 1;

FIG. 7 illustrates an isometric view taken along lines 7—7, as shown in FIG. 2;

FIG. 8 illustrates a side view taken along lines 8—8, as shown in FIG. 4.

Figure 1:
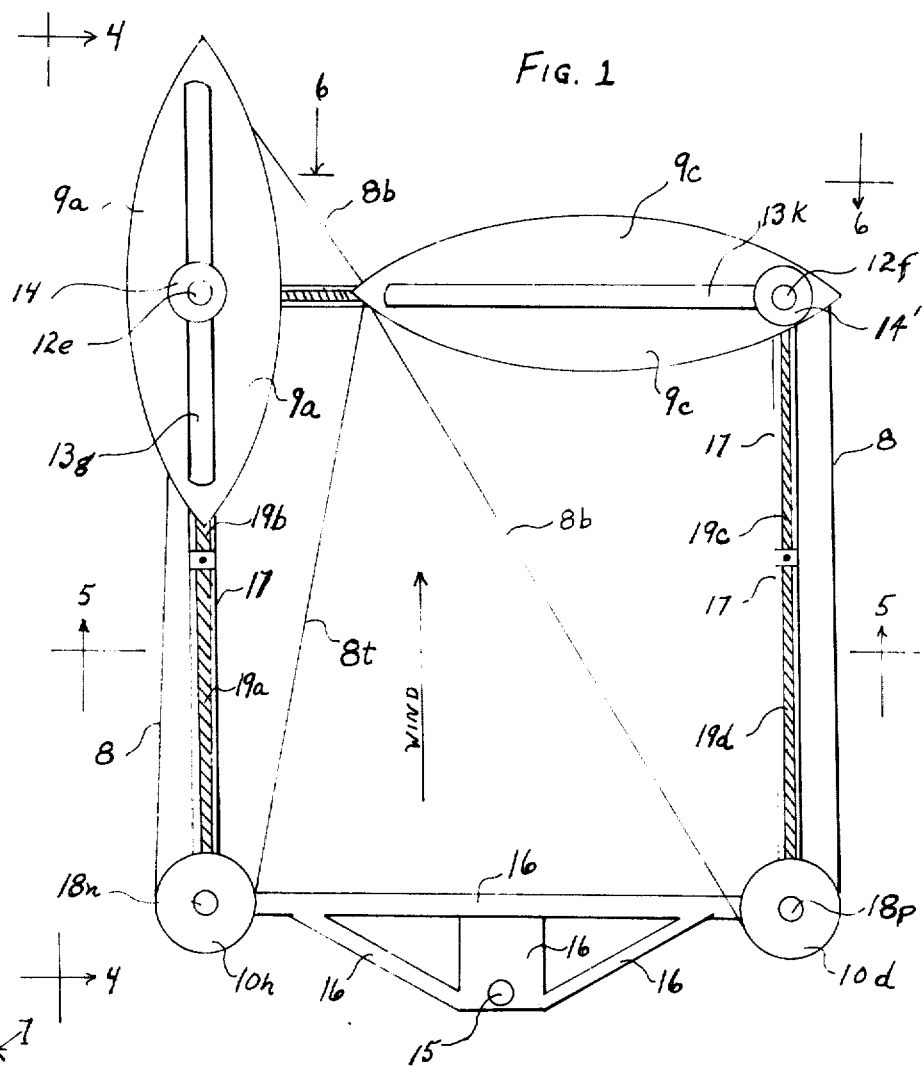
FIG. 1 illustrates a top view of the present invention in its original installation for rope biasing.

In the following discussion describing the present invention, reference will be made to FIG. 1. Top view of the present invention illustrates the rope biasing around the vanes and the two pulleys used in the invention. Vane 9a and vane 9c are placed in the position shown in FIG. 1. Rope 8 is wrapped around vane 9a and vane 9c and then rope 8, rope 8t and rope 8b is then placed in the groove of double sheave ball bearing pulley 10h and double sheave ball bearing pulley 10d and the rope 8, 8b, and 8t is made taut. Vane 9a is placed on mast 12e and situated in slot 13g at midpoint. Washer 14 is then secured to mast 12e to prevent vane 9a from being lifted off mast 12e by the wind. Vane 9c is also placed on mast 12f and mast 12f shown in slot 13k and washer 14' secured to mast 12f. Pin 15 is the center point of the apparatus to be revolved around. Structure 16 is fixed to frame 17 at the junction where stanchion 18n and stanchion 18p is fixed to frame 17 and structure 16. Brace 19a, brace 19b, brace 19c and brace 19d are placed about the frame 17 to brace stanchion 18n and stanchion 18p to frame 17 and also brace mast 12e and mast 12f to frame 17.

Figure 2:
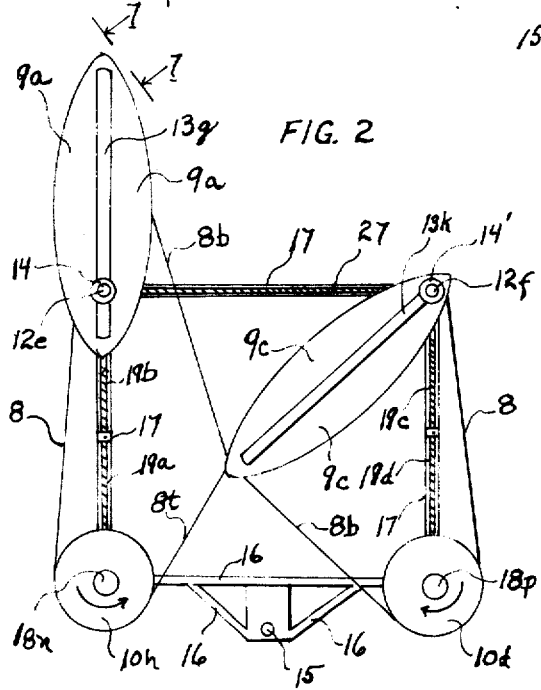
FIG. 2 illustrates a top view of vanes in relative position to each other.

Referring now to FIG. 2, it shows the relationship of vane 9a to vane 9c in various movements about mast 12e and mast 12f and also the movement of vane 9a and 9c in slot 13g and slot 13k. On sheet one of the drawings the wind blows in the direction of the arrow in FIG. 1 and applies to FIG. 2 and FIG. 3. The rotation of double sleeve ball bearing pulley 10h and double sheave ball bearing pulley 10d is shown in this FIG. 2.

Discussing FIG. 3, again the relationship of vane 9a to vane 9c is shown with the rotation of vanes shown in FIG. 3. In operation vane 9a and vane 9c turn "into" the center of the apparatus and this is best shown whereby vane 9a is about to start its power movement being brought to this position by the action of vane 9c which is just about to complete its power movement. Arrows in this FIG. 3 indicate the direction of the movement of rope 8. The arrows shown close to vane 9a and vane 9c show the direction that the vanes rotate.

Referring now to FIG. 4, washer 20 secured to mast 12e by conventional means supports vane 9a on mast 12e so that vane 9a can slide on washer 20 and also pivot and rotate about mast 12e in its various movements. Pin 15 which is fixed to structure 16 is dropped into a prepared hole 22 in concrete 23 and the hole 22 is considered snug to allow pin 15 to rotate in hole 22 360°. Castor 21 is fixed to frame 17 under mast 12e to support this portion of the apparatus that must be movable so that the vanes can be best orientated to the eye of the wind. Double sheave ball bearing pulley 10h is secured to stanchion 18n in a conventional way to best line up with rope 8 and rope 8t. Double sheave ball bearing pulley 10h and double sheave ball bearing pulley 10d are at a different distance from frame 17 to accommodate recess 24 in vane 9a and vane 9c for the operation of the wind-driven motive apparatus. Concrete 25 is a suggested way to facilitate the rolling action of castor 21 and castor 21' as the eye of the wind changes the entire apparatus to different positions so that the vane 9a and vane 9c will operate at their most efficient mode. Flange 26 is used to secure the stanchion 18n and also mast 12e to frame 17.

Discussing FIG. 5, cross support 27 is needed to keep mast 12e and mast 12f at their proper distance from each other so that the invention will operate properly. Washer 20' is shown to support vane 9c on mast 12f. Castor 21' is shown to support that portion of the apparatus so that the entire apparatus can travel in a circular arc on concrete 25 which also should be poured in a circular manner equally distant from pin 15. Vane 9a is shown that its sides are concave to present the most effective surface to the force of the wind and also will help prevent the slackening of rope 8 which is wrapped around each vane 9a and vane 9c one time as shown in the drawings.

Discussing FIG. 6, shows the position of rope 8 when vane 9c is in its power movement and also shows the vertical pivoting of vane 9c about mast 12f.

FIG. 7 is an attempt to show that the ends of each vane 9a and vane 9c come to a cutting edge with provision for the retention of rope 8 in recess 24 that when the vanes are moved forward each vane will offer the least resistance to the force of the wind until each vane turns into the force of the wind and thus completes its power movement and at the same time causes the opposite vane to be moved because of rope 8 means to also turn into the force of the wind.

FIG. 8 shows the different levels of double sheave ball bearing pulley 10h and double sheave ball bearing pulley 10d. This arrangement best serves the purpose of keeping rope 8, rope 8b and rope 8t in line with vane 9a and vane 9c.

In the following discussion describing the present invention and assuming for the moment that the wind is blowing in the direction as shown in FIG. 1, vane 9c will receive the full force of the wind on the surface of vane 9c. Mast 12f is the vertical pivot point for vane 9c to not only pivot about but also mast 12f is a given point in which vane 9c can rotate around. With rope 8 wrapped around vane 9c in the manner shown in the drawings, rope 8t is the rope portion that delivers power at this particular moment. The force of the wind against vane 9c transmits this power to rope 8t which in turn causes double sheave ball bearing pulley 10h to rotate about stanchion 18n. The rotation of double sheave ball bearing pulley 10h pulls into the force of the wind vane 9a, which construction design offers the least resistance to the wind in this mode of operation.

Figure 3:
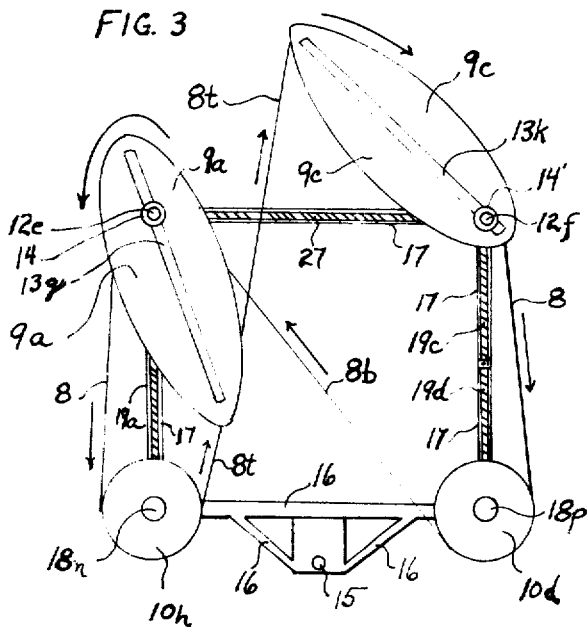
FIG. 3 illustrates a top view of vanes relative position to each other.

When vane 9c reaches the position as shown in FIG. 3, vane 9a has reached the point of movement whereby it will turn into the force of the wind and vane 9a will offer its broad vane surface for the wind to cause vane 9a to move in similar movements that vane 9c had previously completed. Slot 13k and slot 13g provide the means whereby the vane 9a and vane 9c are able to slide on mast 12e and mast 12f and when vane 9a and 9c reach the point of their respective movements about mast 12e and mast 12f, they are able to pivot and then start the movement about mast 12e and mast 12f which result that each vane 9a and vane 9c rotate about mast 12e and mast 12f. With the rope arrangement as shown in the figures it will become evident that it is the rotation of each vane 9a and vane 9c that causes the movement of rope 8 which in turn causes double sheave ball bearing pulley 10h and double sheave ball bearing pulley 10d to rotate about stanchion 18n and stanchion 18p. Rope 8b is associated with double sheave ball bearing pulley 10d and can be considered the "bottom" rope for purposes of discussion. Rope 8t is associated with double sheave ball bearing pulley 10h and can be considered the "top" rope for purposes of discussion.

Further discussion of the present invention is intended in the explanation that when vane 9c is pivoting about mast 12f the power source is received from rope 8t and when vane 9a is pivoting about mast 12e the power source is received from rope 8b.

Further discussion and reference to FIG. 4 structure 16 is an integral part of frame 17 and frame 17 supports the entire wind-driven motive apparatus. Brace 19a and brace 19b are needed to support mast 12e and stanchion 18n to frame 17 due to the strain that is placed upon them by the force of the wind. Pin 15 is placed in concrete 23 and hole 22.

In FIG. 5 in order that the entire wind-driven motive apparatus can best operate efficiently with respect to the eye of the wind castor 21 and castor 21' are used to make the entire wind-driven motive apparatus movable. Concrete 25 could be one way for castor 21 and castor 21' to move upon. Washer 20 and washer 20' support vane 9a and vane 9c and allow vane 9a and vane 9c to slide upon washer 20 and washer 20'. Cross support 27 is needed for purposes of keeping mast 12e and mast 12f at proper distance from each other.

Flange 26 could be a conventional way to secure mast 12e, mast 12f and stanchion 18n, stanchion 18p.

Further discussion and referring to FIG. 5 best shows the purpose of recess 24 to help control rope 8 to stay on vane 9a and vane 9c due to conditions of erratic wind velocity which is normal to this type of energy. Washer 14 and washer 14' secured to mast 12e and mast 12f confine the movement of vane 9a and vane 9c about mast 12e and mast 12f.

For high wind conditions perhaps a device that would cut the rope could be used to meet this condition of wind velocity as the cost of the rope would be small compared with the cost of apparatus.

Although in the discussion of the present invention we have stressed the movement of one vane more than the other it is to be understood that each vane operates in a similar fashion.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

Having thus completely and fully described the invention, what is now claimed is as follows:

1. Apparatus for utilizing the force of the wind to induce rotational movement of at least one power takeoff pulley, said apparatus comprising in combination:
   a. a framework, said framework including a pair of masts and stanchion means;
   b. pivot means for orienting said framework into the eye of the wind;
   c. a first vane mounted upon one of said masts, said first vane being pivotable about said one mast when said first vane extends transverse to the wind and slidable lateral to the longitudinal axis of said one mast when said first vane is essentially in alignment with the wind;
   d. a second vane mounted upon another of said masts, said second vane being pivotable about said other mast when said second vane extends transverse to the wind and slidable lateral to the longitudinal axis of said other mast when said second vane is essentially in alignment with the wind;
   e. pulley means mounted upon said stanchion means;
   f. a power takeoff pulley means attached to said pulley means, said power takeoff pulley means rotating in response to rotation of said pulley means; and
   g. a loop of flexible material engaging and extending from about said first vane, to said pulley means, to said second vane, to said pulley means and back to said first vane, said flexible material being in nonslidable engagement with each of the engaged elements such that rotational or rectilinear movement of one of the engaged elements will result in travel of said flexible material and corresponding pivotal or rectilinear movement of the remaining engaged elements; whereby, the force of the wind is translated to said power takeoff pulley means through movement of said flexible material where such movement is cyclically brought about by one of said first and second vanes alternately pivoting about its respective mast in response to the wind and simultaneously inducing slidable repositioning of the other of said first and second vanes into the wind preparatory to rotation thereof.

2. The apparatus as set forth in claim 1 wherein said stanchion means comprises a pair of stanchions and said pulley means comprises a first and second pulley.

3. The apparatus as set forth in claim 1 wherein said masts are vertically oriented such that said first and second vanes rotate about a vertical axis.

4. The apparatus as set forth in claim 3 wherein each of said first and second vanes include at least one concave side for engagement with the wind.

5. The apparatus as set forth in claim 4 wherein each of said first and second vanes include opposed concave sides for engagement with the wind.

6. The apparatus as set forth in claim 3 wherein said first and second vanes include recesses for receiving said flexible material.

7. The apparatus as set forth in claim 1 wherein each of said first and second vane includes a slot for receiving the respective one of said masts, each said slot serving as a guide to limit the rectilinear movement of the respective one of said first and second vanes and said masts include means for limiting the movement of said first and second vanes along the longitudinal axis of the respective one of said masts.

8. The apparatus as set forth in claim 7 wherein said flexible material comprises a loop of rope.

9. The apparatus as set forth in claim 1 wherein said pivot means includes a downwardly extending pin engaging a cavity to define the locus of pivotal movement of said framework and castors extending downwardly from said framework for supporting the extremity of said framework without impeding pivotal movement of said framework about said pin.

10. The apparatus as set forth in claim 1 including brace means disposed within said framework for maintaining spatial integrity between said first and second masts and said first and second stanchions.

* * * * *